Nov. 22, 1960  R. O. BRADLEY  2,960,925
APPARATUS FOR PROPORTIONING A SECOND MATERIAL BY RATIO
ACCORDING TO THE WEIGHT OF A FIRST MATERIAL
Filed Sept. 9, 1955  2 Sheets-Sheet 1
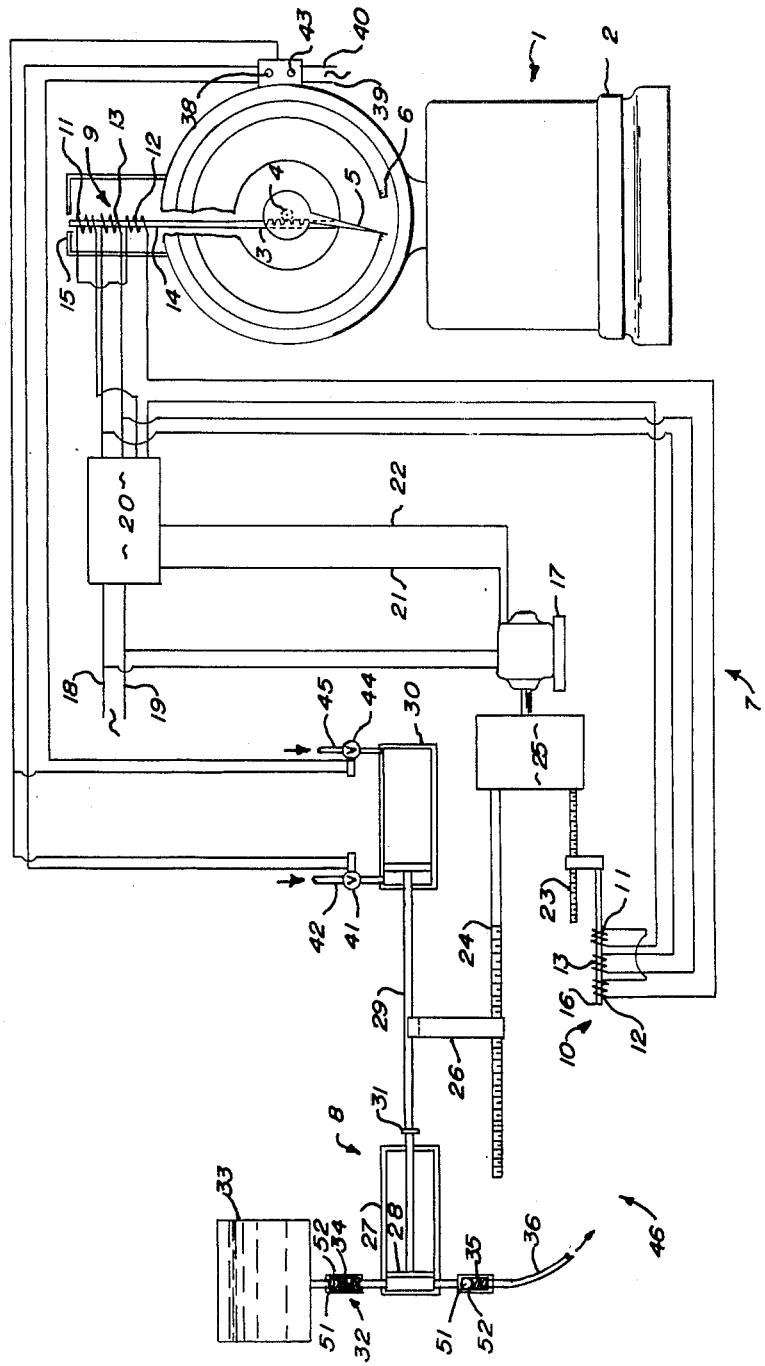
Fig. I
INVENTOR.
ROBERT O. BRADLEY
BY
Marshall, Marshall & Yeasting
ATTORNEYS

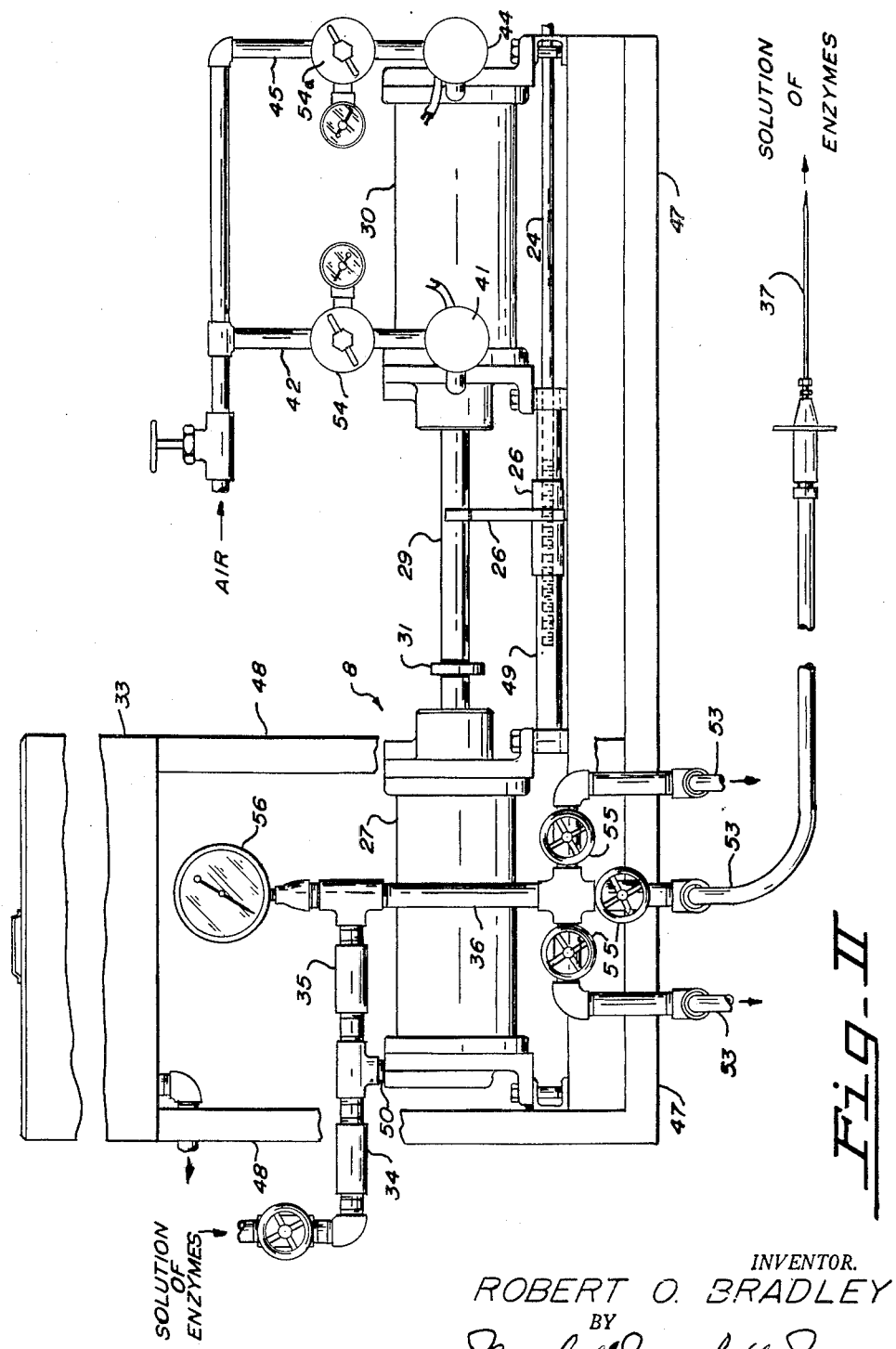

United States Patent Office 2,960,925
Patented Nov. 22, 1960

2,960,925

APPARATUS FOR PROPORTIONING A SECOND MATERIAL BY RATIO ACCORDING TO THE WEIGHT OF A FIRST MATERIAL

Robert O. Bradley, Toledo, Ohio, assignor, by mesne assignments, to Toledo Scale Corporation, Toledo, Ohio, a corporation of Ohio Filed Sept. 9, 1955, Ser. No. 533,352

5 Claims. (Cl. 99—256)

This invention relates to apparatus for accurately proportioning a minor or second material by ratio according to the weight of a first material.

The packing industry loses millions of dollars because of the shrinkage in meat in processes due to moisture loss. Such shrinkage amounts to approximately one percent by weight. The packing industry also has always been faced with the problems of profitably disposing of tough cuts of meat and of profitably disposing of meat which does not have the best of flavor.

The principal object of this invention is to provide means for accurately proportioning a minor or second material by ratio according to the weight of a first material.

Another object of this invention is to provide means for accurately proportioning a minor ingredient by ratio according to the weight of a piece of meat and for incorporating such ingredient with the meat to return the moisture normally lost by a warm carcass and/or to improve the flavor of the meat and to tenderize it.

A further object of the invention is to provide an automatic percentage control pumping device for returning the moisture normally lost by a warm carcass and/or for incorporating a minor ingredient with the meat to improve its flavor and to tenderize it.

Other objects and advantages will be apparent from the following description of preferred embodiments of the invention.

According to the invention, apparatus is provided for accurately proportioning a second material by ratio according to the weight of a first material. The second material may comprise enzymes from an animal source mixed with a suitable solvent, preferably water, which is added to the first material which may be a carcass to return moisture normally lost by a warm carcass and to affect tenderizing and flavor of the meat. At the present time, shrinkage due to moisture loss in the packing industry amounts to approximately one percent by weight. Therefore, at the present time only approximately one percent by weight moisture may be returned to the meat without passing the point where it may be held that the meat is being adulterated by the addition of water. The second material must, therefore, be very accurately proportioned according to the weight of the first material. Such accurate proportioning is not possible with an ordinary weighing scale, since a scale having a capacity to weigh a large piece of meat, such as a side of beef, cannot accurately measure the weight of a second material or minor ingredient which must have a weight that is only one percent of the weight of the large piece of meat.

The present invention provides apparatus including a weighing scale for measuring the weight of a first material, processing equipment for adding a second material to the first material, and means responsive to the scale for controlling the quantity of second material to be added to the first material according to the weight of the first material. Preferably, for large volume operations, the processing equipment comprises a pump for adding the second material to the first material and the means responsive to the scale controls the stroke of the pump according to the weight of the first material.

Preferred embodiments of the invention are illustrated in the accompanying drawings.

In the drawings:

Figure I is a diagrammatic view of a weighing scale, an electrical data transmitting system that is connected to the scale, and a pump the stroke of which is controlled by the data transmitting system.

Figure II is an enlarged and detailed view of the pump and its adjuncts shown in Figure I.

Referring to Figure I, an ordinary weighing scale 1 includes a load receiving platform 2 operatively connected to a rack 3 which moves upwardly under the influence of load on the platform to turn a pinion 4 driving an indicator 5. The indicator 5 cooperates with a circularly arranged series of indicia 6 and points to an indicium indicative of the weight of an object upon the platform 2. The weighing scale 1 has sufficient capacity to accurately measure the weight of a large piece of meat, such as a side of beef. Since the weighing scale 1 has a relatively large capacity, it cannot accurately measure the weight of a minor ingredient comprising enzymes mixed with a solvent, preferably water, which must have a weight that is only one percent of the weight of the large piece of meat to avoid having it held, when the minor ingredient is incorporated with the meat, that such incorporation has adulterated the meat. An electrical data transmitting system 7, therefore, is connected to the scale 1 and is used to control the stroke of a pump 8, which is part of processing equipment to be hereinafter described, according to the weight of the meat upon the platform 2, the pump providing accurately measured quantities of the minor ingredient.

The electrical data transmitting system 7 includes a transmitter differential transformer 9 and an input weight differential transformer 10 associated with designating or indicating the amplitude of applied weight and terminating the input thereof. These transformers 9 and 10, which are preferably identical, may be of any desired sort associated operably with an armature as a relatively movable mass, with the respective coils of the individual transformers so arranged as to provide a resultant output from the secondaries as a function of the relative positioning of the armatures and coils. An example of a weighing scale that is connected in a differential transformer data transmitting system is shown and described in U.S. Patent No. 2,728,285, issued on December 27, 1955, to R. O. Bradley et al.

Each of the transformers 9 and 10 comprises secondaries 11 and 12, axially aligned with and spaced by a primary 13, with the secondaries coupled in series-bucking relation, and with each respective armature mass, to be hereinafter identified, movable axially in preferably concentric relation with all of the coils of a respective transformer, so that the resultant transformer output varies from a substantially null output, when the inductive effect of the armature mass is equal on both secondaries, and an output of a given phase or an opposite phase in accordance with the direction of relative motion of the armature from the substantially null output position, in amplitude a function of the distance of the deviation of the armature mass from the null relative position.

The armature mass 14 of the transformer 9 is fixed atop the rack 3 and is axially movable in response to movements of the platform 2 under loads thereon, the transformer 9 being enclosed in a cabinet 15 surmounting the weighing scale 1. The armature mass 16 of the transformer 10 is axially movable in response to movement of the rotor of a servomotor 17. Any relation of coils and armatures may be used which will function as a differential transformer.

A line circuit is established in the system from leads 18 and 19 which constantly energizes the power windings of the servomotor 17 and which supplies an amplifier 20 connected to the leads 18 and 19. The amplifier 20 supplies a reduced voltage to both of the primaries 13 of the two transformers 9 and 10 in series, and receives the resultant output of both of the transformers, as the algebraic summation of the individual outputs, and has an amplified motor output to the servomotor 17 which is connected to the amplifier 20 by means of leads 21 and 22.

In the operation of the electrical data transmitting system 7, the application of load to the platform 2 depresses it and causes the armature 14 to move relative to the coils of the transmitter transformer 9, furnishing an output therefrom which unbalances the secondaries circuit. The amplifier 20, which receives the resultant output of both of the transformers 9 and 10, has an amplified motor output to the servomotor 17 which runs and turns a pair of worms 23 and 24 connected to the servomotor through a variable ratio transmission gearing box 25. One of the worms 23 drives the armature 16 to a position which develops a cancelling or balancing voltage in the secondaries circuits which stops the servomotor 17 when the secondaries circuit is rebalanced. At the same time, the other worm 24 moves a member 26 to the left, as viewed in Figure I, used to control the stroke of the pump 8, as hereinafter described. The member 26 is, hence, movable according to the weight of load upon the platform 2. Usually, the servomotor 17 completes its running and rebalancing of the secondaries circuit in about three-fifths of a second. The servomotor 17 is sort of a floating member arranged for running whenever permitted so as to remove any and all unbalances that may exist or develop in the secondaries circuit.

The pump 8, shown in detail in Figure II and hereinafter described in detail, includes a pump cylinder 27, a piston 28, a piston rod 29, and an air cylinder 30. The piston rod 29 carries a stop 31 fixed thereon which cooperates with the movable member 26 functioning to control the stroke of the pump 8 according to the weight of load upon the platform 2 of the weighing scale 1. The pump 8 is connected to metering means 32 connected in turn to a source of minor ingredient or supply tank 33, the metering means 32 functioning to pass a quantity of minor ingredient according to the weight of a piece of meat upon the platform 2. The metering means 32 includes an upper check valve 34 which opens and a lower check valve 35 which closes when the piston 28 moves to the right, as viewed in Figure I. When the piston 28 moves to the left, the upper check valve 34 closes and the lower check valve 35 opens and minor ingredient in the pump cylinder 27 is forced through a pipe or tube 36 into one or more hollow perforated needles 37, one of which is shown in Figure II. The needles are thrust into the flesh of the meat being processed before the discharge or pressure stroke of the pump 8 is started so that the minor ingredient is added to and incorporated with the meat.

The stop 31 is so located on the rod 29 and the gearing in the ratio transmission gearing box 25 is so chosen that, when the stop cooperates with the member 26, the intake or suction stroke of the pump 8 has drawn a volume of minor ingredient from the tank 33 that has a weight equal to one percent of the weight of the meat to be processed. The pump 8 will always draw a charge of minor ingredient which is equal in weight to one percent of the weight of any size piece of meat that is upon the platform 2 and that can be accurately weighed by the scale 1. When the weight ratio of minor ingredient to meat is to be changed from 1:100, a suitable substitution of gears may be made in the ratio transmission gearing box 25.

In the overall operation of the meat pumping apparatus, a piece of meat to be processed is placed upon the platform 2. In about three-fifths of a second, the member 26 of the electrical data transmitting system 7 will be in pump-controlling position. A button 38 in a line circuit established from leads 39 and 40 then is depressed by an operator causing a normally closed solenoid valve 41 to open. Opening of the valve 41 permits compressed air from an air supply line 42 to enter the air cylinder 30 which moves the piston rod 29 to the right until the stop 31 fixed on the rod contacts the movable member 26. This causes the piston 28 to draw minor ingredient from the tank 33 in an amount equal in weight to one percent of the meat upon the platform 2. The needles 37 are then inserted into the flesh of the meat on the weighing scale and a button 43 is depressed by the operator causing a normally closed solenoid valve 44 to open. Opening of the valve 44 permits compressed air from an air supply line 45 to enter the air cylinder 30 which moves the piston rod 29 to the left and forces the charge of minor ingredient from the pump 8 through the tube 36 and the needles 37 connected thereto into the meat incorporating the minor ingredient with the meat.

In order to speed up production, the meat to be processed may be moved to a processing station 46 located away from the weighing scale 1 in a convenient location after weighing and after the stop 31 has been positioned by the movable member 26. Removal of the load from the scale causes the armature 14 of the transformer 9 to move downwardly and the servomotor 17 to start and drive the armature 16 of the transformer 10 and the movable member 26 of the data transmitting system 7 to the right to zero load position. The needles 37 of the processing equipment may then be inserted into the meat and another piece of meat placed upon the scale 1. While the pump 8 is forcing its charge of minor ingredient through the needles 37 and into the meat, the second piece of meat on the scale may be weighed and the member automatically repositioned. There is thus provided an automatic percentage control pumping device for returning the moisture normally lost by a warm carcass and/or for incorporating a minor ingredient with the meat to improve its flavor and to tenderize it.

The processing equipment including the pump 8 and the movable member 26 of the electrical data transmitting system 7 are shown in enlarged detail in Figure II. The pump 8 is securely mounted on a base 47 having an upstanding frame 48 at one end thereof supporting the supply tank 33. The pump 8, which includes the pump cylinder 27, the piston rod 29, and the air cylinder 30, is actuated by compressed air which is supplied through the air line 42 when the solenoid valve 41 is opened and by compressed air which is supplied through the air line 45 when the solenoid valve 44 is opened, as hereinbefore described.

The intake or suction stroke of the pump 8, i.e., the stroke which moves the stop 31 fixed on the piston rod 29 to the right, is controlled by the position of the movable member 26 according to the weight of the meat on the weighing scale 1 (Figure I). The movable member 26 is slidable on a pair of spaced apart rods 49, one of which may be seen in Figure II, mounted on the base 47. The worm 24 is located between the rods 49 and when it is turned by the servomotor 17 (Figure I) it drives the member 26 and causes it to slide one way or the other upon the rods. Such intake stroke of the pump 8 causes the check valve 34 to open and the check valve 35 to close. The check valves 34 and 35 are shown in detail in Figure I and include orifices 51 closed and opened by spring loaded balls 52. Opening of the valve 34 permits minor ingredient to be drawn by the suction stroke from the supply tank 33 into the cylinder 27 through a pipe 50.

The discharge or pressure stroke of the pump 8, i.e., the stroke which moves the stop 31 on the piston rod 29 to the left, causes the check valve 34 to close and the check valve 35 to open. Opening of the valve 35 permits the charge of minor ingredient in the pump cylinder 27 to be forced by the pressure stroke through the pipes 50 and 36 into hoses 53 connected to the hollow perforated needles 37, one of which is shown in Figure II, and into the flesh of the meat into which the needles 37 are inserted.

Pressure controllers 54 and 54a are provided in the air lines 42 and 45. The controller 54 in the line 42 is used to insure that there is only just sufficient force on the suction stroke to move the stops 31 gently into contact with the adjustable member 26. If the stop hits with excessive impact, the pressure may be reduced. If the piston rod 29 fails to move back smoothly, the pressure may be increased until it does. The controller 54a in the line 45 is used to impart such minor ingredient pressure as is required to satisfactorily process the meat, the rate of flow of the ingredient being controlled by hand operated valves 55 connected above the hoses 53. To check line losses in the system, a pressure gauge 56 is provided above the pipe 36, the difference between the pressures shown on the gauge of the controller 54 and on the pressure gauge 56 equaling the line losses in the system.

Various modifications in details of construction of the parts of the apparatus may be made and other applications of the apparatus may be made to processes other than meat pumping which require a percentage addition of a second material to a first material without departing from the spirit and scope of the invention.

Having described the invention, I claim:

1. Apparatus for adding a quantity of a minor ingredient to an object having a base weight comprising, in combination, base weight measuring means, minor ingredient measuring means, the measuring means each being capable of measuring independently of the other, means responsive to the base weight measuring means for controlling the quantity of minor ingredient measured by the minor ingredient measuring means, and means operatively connected to the minor ingredient measuring means for adding measured minor ingredient to the object.

2. Apparatus for adding a quantity of a minor ingredient to an object having a base weight comprising, in combination, base weight measuring means having a first capacity, minor ingredient volumetric measuring means having a second capacity which is substantially less than the first capacity, means responsive to the base weight measuring means for controlling the quantity of minor ingredient measured by the minor ingredient measuring means, and means operatively connected to the minor ingredient measuring means for adding measured minor ingredient to the object.

3. Apparatus according to claim 2 wherein the minor ingredient measuring means is remotely located relative to the base weight measuring means.

4. Apparatus for adding a quantity of a minor ingredient to an object having a base weight comprising, in combination, base weight measuring means, minor ingredient volumetric measuring means, means responsive to the base weight measuring means for controlling the quantity of minor ingredient measured by the minor ingredient measuring means, and means operatively connected to the minor ingredient measuring means for adding measured minor ingredient to the object.

5. Apparatus according to claim 4 wherein the minor ingredient measuring means is remotely located relative to the base weight measuring means.

References Cited in the file of this patent

UNITED STATES PATENTS

| Number | Name | Date |
|---|---|---|
| 1,352,097 | Sonander | Sept. 7, 1920 |
| 2,148,923 | Beisser | Feb. 28, 1939 |
| 2,169,465 | Hadley | Aug. 15, 1939 |
| 2,605,695 | Campbell | Aug. 5, 1952 |
| 2,663,247 | Hensgen et al. | Dec. 22, 1953 |
| 2,687,037 | Saxe | Aug. 24, 1954 |
| 2,728,285 | Bradley et al. | Dec. 27, 1955 |
| 2,755,732 | Sanderson | July 24, 1956 |
| 2,792,275 | Drillick | May 14, 1957 |
| 2,812,705 | Zillie | Nov. 12, 1957 |